(12) United States Patent
Chen

(10) Patent No.: US 12,593,347 B2
(45) Date of Patent: Mar. 31, 2026

(54) METHOD FOR TRANSMITTING INDICATION SIGNAL, TERMINAL AND NETWORK DEVICE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 375 days.

(21) Appl. No.: 17/389,425

(22) Filed: Jul. 30, 2021

(65) Prior Publication Data

US 2021/0360636 A1 Nov. 18, 2021

Related U.S. Application Data

(63) Continuation of application No. PCT/CN2020/073787, filed on Jan. 22, 2020.

(51) Int. Cl.
| | |
|---|---|
| *H04W 72/23* | (2023.01) |
| *H04W 24/08* | (2009.01) |
| *H04W 72/0453* | (2023.01) |
| *H04W 72/53* | (2023.01) |

(52) U.S. Cl.
CPC .......... *H04W 72/53* (2023.01); *H04W 24/08* (2013.01); *H04W 72/0453* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 11,375,518 | B2* | 6/2022 | Lin | H04W 76/28 |
| 2013/0016639 | A1* | 1/2013 | Xu | H04W 24/08 |
| | | | | 370/329 |
| 2015/0201456 | A1* | 7/2015 | Lee | H04W 72/21 |
| | | | | 370/311 |
| 2018/0263048 | A1 | 9/2018 | Ingale et al. | |
| 2019/0021052 | A1 | 1/2019 | Kadiri et al. | |
| 2019/0254110 | A1* | 8/2019 | He | H04L 41/0896 |
| 2020/0037396 | A1* | 1/2020 | Islam | H04W 52/0229 |
| 2020/0084717 | A1* | 3/2020 | Höglund | H04W 52/0219 |

(Continued)

FOREIGN PATENT DOCUMENTS

| | | |
|---|---|---|
| CN | 109219113 A | 1/2019 |
| CN | 109286966 A | 1/2019 |
| WO | 2018175760 A1 | 9/2018 |

OTHER PUBLICATIONS

VIVO, "Discussion on triggering adaptation of UE power consumption characteristics", 3GPP TSG RAN WG1 #95, Spokane, USA, Nov. 1ih-16, 2018.

(Continued)

*Primary Examiner* — Duc T Duong
(74) *Attorney, Agent, or Firm* — Price Heneveld LLP

(57) ABSTRACT

A method for transmitting an indication signal, a terminal and a network device are provided. The method includes: receiving a pre-indication signal, where the pre-indication signal is configured to indicate to monitor a physical downlink control channel (PDCCH) or not to monitor the PDCCH; and performing a monitoring behavior on a first resource corresponding to the pre-indication signal according to the pre-indication signal.

5 Claims, 3 Drawing Sheets

(56) References Cited

U.S. PATENT DOCUMENTS

| | | | |
|---|---|---|---|
| 2020/0092073 A1* | 3/2020 | Papasakellariou | ............................ H04W 72/0446 |
| 2020/0092814 A1* | 3/2020 | Zhou | ................. H04W 52/0235 |
| 2020/0169991 A1* | 5/2020 | Lin | ........................ H04W 72/56 |
| 2020/0229100 A1* | 7/2020 | He | ........................ H04W 80/02 |
| 2020/0236692 A1* | 7/2020 | Lin | ........................ H04L 5/0007 |
| 2020/0245249 A1* | 7/2020 | Medles | ................. H04W 72/23 |
| 2021/0051759 A1* | 2/2021 | Zhou | ..................... H04W 76/11 |
| 2021/0119742 A1* | 4/2021 | Wu | ........................ H04L 5/0094 |
| 2021/0168759 A1 | 6/2021 | Pan et al. | |
| 2021/0195518 A1* | 6/2021 | Su | .......................... H04W 72/23 |
| 2021/0227466 A1* | 7/2021 | Kim | .................... H04W 68/025 |
| 2021/0235492 A1* | 7/2021 | Iyer | ........................ H04L 5/0092 |
| 2021/0259044 A1* | 8/2021 | Islam | ................ H04W 52/0229 |
| 2021/0337476 A1* | 10/2021 | Shan | ................. H04W 52/0229 |
| 2021/0400507 A1* | 12/2021 | You | ........................ H04L 5/0048 |
| 2022/0086756 A1* | 3/2022 | Reial | ................. H04W 52/0229 |
| 2022/0116875 A1* | 4/2022 | Nimbalker | ........ H04W 52/0216 |
| 2022/0116976 A1* | 4/2022 | Nory | .................... H04W 76/28 |

OTHER PUBLICATIONS

Qualcomm Inc., "UE Adaptation to the Traffic and UE Power Consumption Characteristics", 3GPP TSG-RAN WG1 1 Ad-Hoc Meeting 1901 R1-1900911, Taipei, Taiwan, Jan. 21-25, 2019.

"3rd Generation Partnership Project; Technical Specification Group Radio Access Network; NR-' Study on UE Power Saving (Release 16)", 3GPP TR 38.840 V0.1.0 (Nov. 2018), Valbonne, France.

\* cited by examiner

600

Terminal

611

601 — Radio frequency unit

Power supply

610

609

Memory

Application program

Operating system

Processor

608 — Interface unit

User input unit

6071

607 —

Touch panel

Other input devices

6072

Network module — 602

Audio output unit — 603

604

Input unit

Graphics processing unit — 6041

Microphone — 6042

Sensor — 605

Display unit

Display panel — 606

6061

700

Network device

701 — Processor

703 — Memory

Bus interface

Transceiver — 702

METHOD FOR TRANSMITTING INDICATION SIGNAL, TERMINAL AND NETWORK DEVICE

CROSS-REFERENCE TO RELATED APPLICATION

This application is a continuation application of a PCT Application No. PCT/CN2020/073787 filed on Jan. 22, 2020, which claims priority to Chinese Patent Application No. 201910100604.6 filed in china on Jan. 31, 2019, the disclosures of which are incorporated herein by reference in their entireties.

TECHNICAL FIELD

The present disclosure relates to the technical field of communication, more particularly, to a method for transmitting an indication signal, a terminal and a network device.

BACKGROUND

To save the power consumption of a terminal in the communication technology, a discontinuous reception (DRX) cycle is introduced. The terminal calculates a corresponding paging frame (PF) and a paging occasion (PO) according to a terminal identifier, and monitors a physical downlink control channel (PDCCH) at the position of each paging frame (PF) and paging occasion (PO), resulting in high power consumption of the terminal.

SUMMARY

Embodiments of the present invention provide a method for transmitting an indication signal, a terminal and a network device.

According to a first aspect, some embodiments of the present disclosure provide a method for transmitting an indication signal, applied to a terminal, including:

receiving a pre-indication signal, where the pre-indication signal is configured to indicate to monitor PDCCH or not to monitor the PDCCH; and performing a monitoring behavior on a first resource corresponding to the pre-indication signal according to the pre-indication signal.

According to a second aspect, some embodiments of the present disclosure provide a method for transmitting an indication signal, applied to a network device, including:

transmitting a pre-indication signal, where the pre-indication signal is configured to indicate to monitor PDCCH or not to monitor the PDCCH.

According to a third aspect, some embodiments of the present disclosure provide a terminal, including:

a receiving module, configured to receive a pre-indication signal, where the pre-indication signal is configured to indicate to monitor a physical downlink control channel (PDCCH) or not to monitor the PDCCH; and a processing module, configured to perform a monitoring behavior on a first resource corresponding to the pre-indication signal according to the pre-indication signal.

According to a fourth aspect, some embodiments of the present disclosure provide a network device, including:

a transmitting module, configured to transmit a pre-indication signal, where the pre-indication signal is configured to indicate to monitor PDCCH or not to monitor the PDCCH.

According to a fifth aspect, some embodiments of the present disclosure provide a terminal, including: a memory, a processor and a program which is stored in the memory and capable of running on the processor, where when the program is executed by the processor, steps of the method for transmitting the indication signal at a terminal side provided by some embodiments of the present disclosure are implemented.

According to a sixth aspect, some embodiments of the present disclosure provide a network device, including: a memory, a processor and a program which is stored in the memory and capable of running on the processor, where when the program is executed by the processor, steps of the method for transmitting the indication signal at a network device side provided by some embodiments of the present disclosure are implemented.

According to a seventh aspect, some embodiments of the present disclosure provide a computer readable storage medium, where the computer readable storage medium stores a computer program; and when the computer program is executed by the processor, steps of the method for transmitting the indication signal at a terminal side provided by some embodiments of the present disclosure are implemented, or when the computer program is executed by the processor, steps of the method for transmitting the indication signal at a network device side provided by some embodiments of the present disclosure are implemented.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: only A exists, only B exists, and both A and B exist.

In some embodiments of the present disclosure, the word such as "exemplary" or "for example" is used to represent giving an example, an illustration, or a description. Any embodiment or design scheme described as "exemplary" or "for example" in some embodiments of the present disclosure should not be explained as being more preferred or having more advantages than other embodiments or design schemes. Exactly, use of the term "exemplary" or "for example" is intended to present a relevant concept in a specific manner.

The embodiments of the present disclosure are described below with reference to the accompanying drawings. A method for transmitting an indication signal, a terminal, and a network device provided in some embodiments of the present disclosure may be applied to a wireless communication system. The wireless communication system may be a 5G system, or an evolved long term evolution (eLTE) system or a long term evolution (LTE) system, or a subsequent evolution communication system, or the like.

Figures 1, 2:
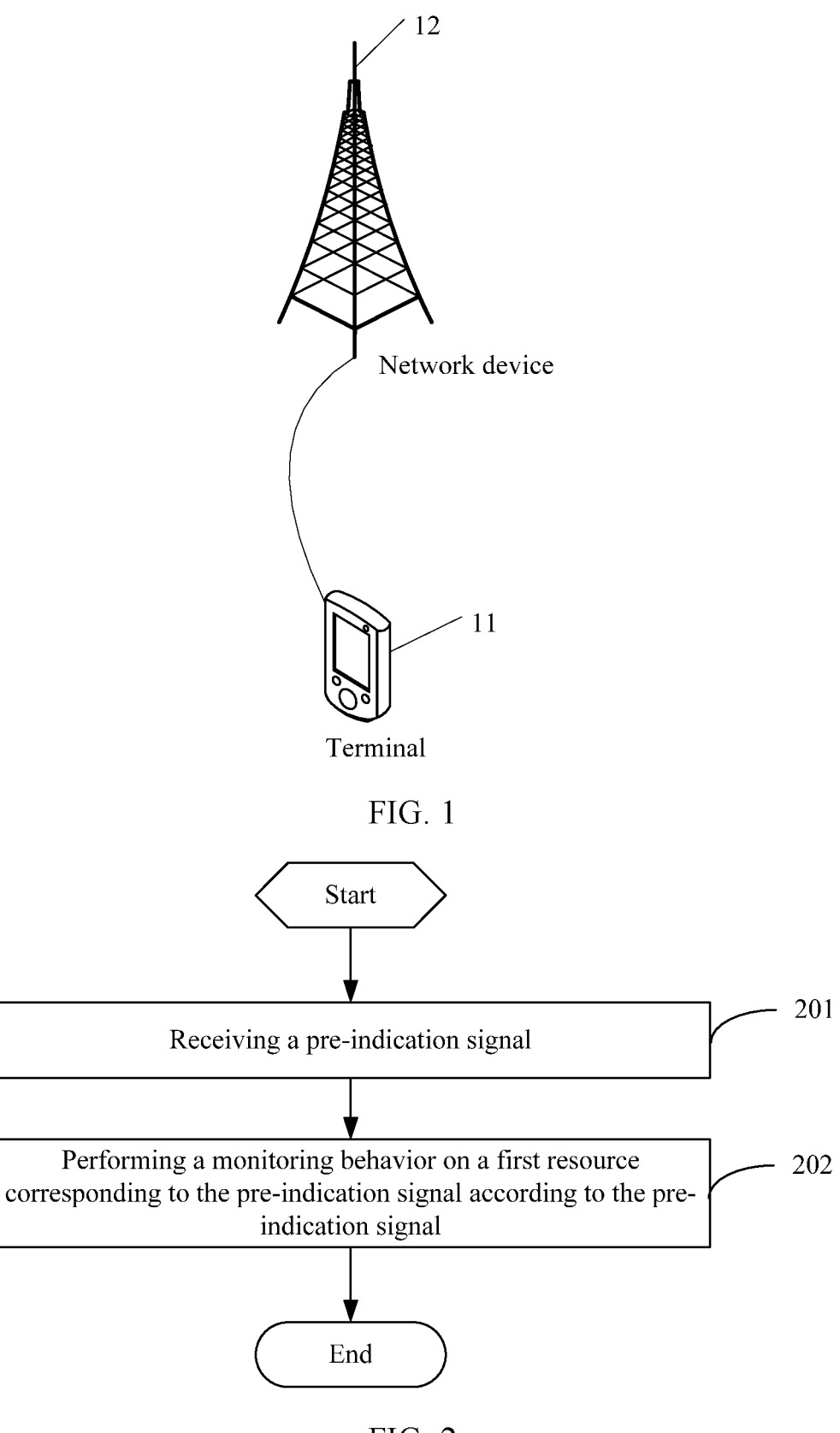
FIG. 1 is a structural diagram of a network system that may be applied to some embodiments of the present disclosure.
FIG. 2 is a flowchart of a method for transmitting an indication signal according to some embodiments of the present disclosure.

Referring to FIG. 1, FIG. 1 is a structural diagram of a network system that may be applied to some embodiments of the present disclosure. As shown in FIG. 1, the network system includes: a terminal 11 and a network device 12, where the terminal 11 may be user equipment (UE) or other terminal side devices, for example: a mobile phone, a tablet personal computer, a laptop computer (Laptop Computer), a personal digital assistant (personal digital assistant, PDA), a mobile Internet device (Mobile Internet Device, MID), a wearable device or a robot. It should be noted that a specific type of the terminal 11 is not limited in some embodiments of the present disclosure. The above network device 12 may be a 4G base station, or a 5G base station, or a base station of a later version, or a station in other communication systems, or be called as a node B, an evolved node B, or a transmission reception point (TRP), or an access point (AP), or other words in the field. As long as the same technical effect is achieved, the network device is not limited to specific technical words. In addition, the above network device 12 may be a master node (MN) or a secondary node (SN). It should be noted that in some embodiments of the present disclosure, only the 5G base station is used as an example, but a specific type of the network device is not limited.

Referring to FIG. 2, FIG. 2 is a flowchart of a method for transmitting an indication signal according to some embodiments of the present disclosure. The method is applied to a terminal. As shown in FIG. 2, the method includes the following steps:

Step 201: receiving a pre-indication signal, where the pre-indication signal is configured to indicate to monitor PDCCH or not to monitor the PDCCH.

Step 201 may be that the pre-indication signal transmitted by the network device is received. In addition, the terminal may be in a sleep state before receiving the pre-indication signal.

Step 202: according to the pre-indication signal, performing a monitoring behavior on a first resource corresponding to the pre-indication signal.

The first resource corresponding to the pre-indication signal may be a resource corresponding to a transmission resource of the pre-indication signal. For example: a corresponding relationship between the first resource and the transmission resource of the pre-indication signal is defined in a protocol, or the terminal pre-configures a corresponding relationship between the first resource and the transmission resource of the pre-indication signal, or the terminal and the network device negotiate a corresponding relationship between the first resource and the transmission resource of the pre-indication signal in advance.

That the pre-indication signal indicates to monitor or not to monitor the PDCCH may be distinguished by different contents included in the pre-indication signal. For example: the pre-indication signal may include:

an indication signal (may be called as pre-indication), a paging indication, a wake-up signaling (WUS) or a go-to-sleep (GTS) signal per-first resource.

The indication signal per-first resource may be configured to indicate to monitor the PDCCH or not to monitor the PDCCH on the first resource.

The first resource may be a cell, a bandwidth part (BWP), a cell group, a carrier or a band combination (BC). That is, the indication signal may be an indication signal per-cell, per-BWP, per-cell group, per-carrier or per-BC and is configured to indicate to monitor the PDCCH or not to monitor the PDCCH on these resources.

The paging indication or WUS may be configured to represent that it is necessary to monitor the PDCCH, for example: indicating that a paging message of a terminal is on the first resource; and the GTS may be configured to represent that the PDCCH is not monitored, for example: indicating that a paging message of a terminal is not on the first resource or indicating that the terminal enters a dormant state.

It should be noted that the pre-indication signal may be transmitted to the terminal, or may be transmitted to a terminal group (for example: UE group) which the terminal belongs to.

The step of performing the monitoring behavior on the first resource corresponding to the pre-indication signal according to the pre-indication signal may include:

monitoring the PDCCH on the first resource corresponding to the pre-indication signal in the case that the pre-indication signal indicates to monitor the PDCCH; or not monitoring the PDCCH on the first resource corresponding to the pre-indication signal in the case that the pre-indication signal indicates not to monitor the PDCCH.

In this way, the PDCCH may be monitored or not monitored on the first resource according to the pre-indication signal, thereby saving the power consumption of the terminal.

It should be noted that the method for transmitting the indication signal provided by some embodiment of the present disclosure may be applied to a carrier aggregation (CA) scene or a dual-connectivity (DC) scene.

In some embodiments of the present disclosure, the terminal may monitor or not monitor the PDCCH according to the pre-indication signal through the above steps, so that the power consumption of the terminal may be saved.

As an optional implementation manner, the pre-indication signal is transmitted per-cell, per-BWP, per-cell group, per-carrier or per-BC.

It should be noted that the pre-indication signal being transmitted per-cell, per-BWP, per-cell group, per-carrier or per-BC may be called as that the pre-indication signal is configured per-cell, per-BWP, per-cell group, per-carrier or per-BC. In addition, that the pre-indication signal is transmitted per-cell, per-BWP, per-cell group, per-carrier or per-BC may be configured in a protocol or may be pre-configured.

If the pre-indication signal is transmitted per-cell, the first resource may include a cell which transmits the pre-indication signal. Specifically, the first source may be a cell which transmits the pre-indication signal.

In this way, the pre-indication signal may be a pre-indication signal configured per-cell. For example: a pre-indication signal may be transmitted to a terminal or a terminal group according to the unit of each cell. If there is a pre-indication signal for the terminal or the terminal group in this cell, the pre-indication signal is transmitted in this cell. In this way, the terminal may be prevented from monitoring PDCCH in a plurality of cells, thereby further saving the power consumption of the terminal.

Further, if the pre-indication signal is transmitted per-cell, the first resource may include an active BWP, an initial BWP, a default BWP or a configured BWP of the cell which transmits the pre-indication signal. The configured BWP may be pre-configured or may be configured in a protocol. Specifically, the first resource may be an active BWP, an initial BWP, a default BWP or a configured BWP of the cell which transmits the pre-indication signal. In this way, the power consumption of the terminal may be further saved.

In addition, if the pre-indication signal is transmitted per-BWP, the first resource may include a BWP which transmits the pre-indication signal. Specifically, the first source may be a BWP which transmits the pre-indication signal.

In this way, the pre-indication signal may be a pre-indication signal configured per-BWP. For example: a pre-indication signal may be transmitted to a terminal or a terminal group according to the unit of each BWP. If there is a pre-indication signal for the terminal or the terminal group on this BWP, the pre-indication signal is transmitted under this BWP.

In this way, the terminal may be prevented from monitoring PDCCH in a plurality of BWPs, thereby further saving the power consumption of the terminal.

In addition, if the pre-indication signal is transmitted per-cell group, the first resource may include a cell group which transmits the pre-indication signal. Specifically, the first source may be a plurality of cells or all cells in a cell group which transmits the pre-indication signal.

In this way, the pre-indication signal may be a pre-indication signal configured per-cell group. For example: a pre-indication signal is transmitted to a terminal or a terminal group according to the unit of each cell group. If there is a pre-indication signal for the terminal or the terminal group on this cell group, any cell in this cell group has a pre-indication signal for the terminal or terminal group and the pre-indication signal will be transmitted according to the unit of this cell group, for example: each cell in this cell group transmits the pre-indication signal.

Due to the pre-indication signal configured per-cell group, the terminal is prevented from missing the PDCCH of some cells.

In addition, if the pre-indication signal is transmitted per-carrier, the first resource may include a carrier which transmits the pre-indication signal. Specifically, the first source may be a carrier which transmits the pre-indication signal.

In this way, the pre-indication signal may be a pre-indication signal configured per-carrier. For example: a pre-indication signal is transmitted to a terminal or a terminal group according to the unit of each carrier. If there is a pre-indication signal for this terminal or terminal group on this carrier, the pre-indication signal is transmitted under this carrier. In this way, the terminal may be prevented from monitoring PDCCH in a plurality of carriers, thereby further saving the power consumption of the terminal.

In addition, the pre-indication signal is transmitted per-BC, and the first resource may include a BC which transmits the pre-indication signal. Specifically, the first source may be a BC which transmits the pre-indication signal.

In this way, the pre-indication signal may be a pre-indication signal configured per-BC. For example: a pre-indication signal may be transmitted to a terminal or a terminal group according to the unit of each BC. If there is a pre-indication signal to this terminal or terminal group on this BC, the pre-indication signal is transmitted under this BC. In this way, the terminal may be prevented from monitoring PDCCH in a plurality of BCs, thereby further saving the power consumption of the terminal.

In the above implementation manner, the first resource corresponding to the pre-indication signal may include: a cell, a BWP, a cell group, a carrier or a BC. If a pre-indication signal on a resource is received to indicate that PDCCH needs to be monitored, the terminal monitors the PDCCH on the following resources:

on a corresponding cell, which may be specifically an active BWP, an initial BWP or a default BWP;

on a corresponding cell group, carrier or BC; and on a corresponding BWP.

As an optional implementation manner, the pre-indication signal is transmitted on a primary cell (Pcell), and the first resource includes the Pcell, or the first resource includes the Pcell or a secondary cell (Scell); or the pre-indication signal is transmitted on a primary secondary cell (PScell), and the first resource includes the PScell, or the first resource includes the PScell or a Scell.

In this implementation manner, it may be realized in a CA scene, when the terminal is configured with CA, the pre-indication signal is transmitted only on the Pcell or PScell, and the terminal monitors a pre-indication signal message only on the Pcell or PScell.

For example: when the pre-indication signal indicates that PDCCH needs to be monitored, the terminal monitors the PDCCH on the Pcell or PScell, or the terminal monitors the PDCCH on the Pcell and the Scell, or the terminal monitors the PDCCH on the PScell and the Scell; and when the pre-indication signal indicates that the PDCCH does not need to be monitored, the terminal does not monitor the PDCCH on the Pcell or PScell, or the terminal does not monitor the PDCCH on the Pcell and the Scell, or the terminal does not monitor the PDCCH on the PScell and the Scell.

It should be noted that the first resource including the Pcell or PScell may include all resources of the Pcell or PScell, the first resource including the Pcell and the Scell may include all resources of the Pcell and the Scell, and the first resource including the PScell and the Scell may include all resources of the PScell and the Scell, for example: the pre-indication signal is transmitted per-cell.

Alternatively, the first resource including the Pcell or PScell may include part of resources of the Pcell or PScell, the first resource including the Pcell and the Scell may include part of resources of the Pcell and the Scell, and the first resource including the PScell and the Scell may include part of resources of the PScell and the Scell, for example: the pre-indication signal is transmitted per-BWP, per-carrier or per-BC. The details may be as follows:

if the pre-indication signal is transmitted per-BWP, the first resource may include a BWP which transmits the pre-indication signal in the Pcell or the PScell, or the first resource may include a BWP which transmits the pre-indication signal in the Pcell and the Scell, or the first resource may include a BWP which transmits the pre-indication signal in the PScell and the Scell; or if the pre-indication signal is transmitted per-carrier, the first resource may include a carrier which transmits the pre-indication signal in the Pcell or the PScell, or the first resource may include a carrier which transmits the pre-indication signal in the Pcell and the Scell, or the first resource may include a carrier which transmits the pre-indication signal in the PScell and the Scell; or if the pre-indication signal is transmitted per-BC, the first resource may include a BC which transmits the pre-indication signal in the Pcell or the PScell, or the first resource may include a BC which transmits the pre-indication signal in the Pcell and the Scell, or the first resource may include a BC which transmits the pre-indication signal in the PScell and the Scell.

Taking the case where the pre-indication signal is transmitted per-carrier as an example, the first resource including the carrier which transmits the pre-indication signal in the Pcell or the PScell is that in the case that the first resource includes the Pcell or the PScell, further, the first resource may include a carrier which transmits the pre-indication signal in the Pcell or the PScell. The first resource including the carrier which transmits the pre-indication signal in the Pcell and the Scell is that in the case that the first resource includes the Pcell and the Scell; further, the first resource may include the carrier which transmits the pre-indication signal in the Pcell and the Scell. The first resource including the carrier which transmits the pre-indication signal in the PScell and the Scell is that in the case that the first resource includes the PScell and the Scell; further, the first resource may include the carrier which transmits the pre-indication signal in the PScell and the Scell. The condition that the pre-indication signal is transmitted per-BWP or per-BC may be referenced to the corresponding description of the carrier, which is not elaborated here.

It should be noted that the pre-indication signal is transmitted on the Pcell, and the first resource includes the Pcell, or the first resource includes the Pcell and the Scell. The "or" represents that two cases may be agreed in a protocol or may be pre-configured, for example: the protocol appoints that the pre-indication signal is transmitted on the Pcell, and the first resource includes the Pcell. The two cases that the pre-indication signal is transmitted on the PScell are the same, which is not elaborated here.

Of course, the two cases may also be flexibly indicated, for example: the two cases may be indicated and distinguished by bits in the pre-indication signal. An optional manner is as follows:

the pre-indication signal indicates, through first information, whether to monitor the PDCCH on the Pcell or the PScell or not, and/or indicates, through second information, whether to monitor the PDCCH on the Scell.

Another optional manner is as follows:

the pre-indication signal indicates, through third information, whether to monitor the PDCCH on the Pcell and the Scell respectively, or indicates, through third information, whether to monitor the PDCCH on the PScell and the Scell respectively.

It should be noted that the first information, the second information and the third information may be different bits. For example: the first information is a certain bit, the second information is another bit, and the third information may be other bits.

Specifically, the first information may be one or more bits, the second information may be one or more bits, and the third information may also be one or more bits. For example: the number of bits of the first information, the second information and the third information may be pre-configured.

In this implementation manner, the monitoring situations of different resources may be indicated through different information, so that the power consumption of the terminal is further saved. For example: when the PDCCH serves as the pre-indication signal, the monitoring situations of different resources may be indicated through a preset number of bits in downlink control information (DCI). For example:

a certain bit indicates whether to monitor the PDCCH of the Pcell or the PDCCH of the PScell;

a certain bit indicates whether to monitor Scell PDCCH; and different states of two bits indicate whether to monitor the PDCCH of the Pcell and the Scell respectively, or different states of two bits indicate whether to monitor the PDCCH of the PScell and the Scell respectively.

For example: 01 indicates not to monitor Pcell PDCCH or PScell PDCCH, but monitor Scell PDCCH; 11 indicates to monitor Pcell PDCCH or PScell PDCCH, and monitor Scell PDCCH; and 00 indicates not to monitor Pcell PDCCH or PScell PDCCH, and not to monitor Scell PDCCH.

The first information, the second information and the third information may be a bit in a pre-indication signal sequence, or a bit in a DCI corresponding to PDCCH corresponding to a pre-indication signal, that is, may carry at least one of the first information, the second information and the third information through the DCI.

As an optional implementation manner, the pre-indication signal includes:

a first pre-indication signal transmitted on a Pcell or a PScell and a second pre-indication signal transmitted on a Scell, where a first source corresponding to the first pre-indication signal includes the Pcell or the PScell, and a first resource corresponding to the second pre-indication signal includes the Scell.

It should be noted that the first pre-indication signal and the second pre-indication signal may be the same type of indication signal, for example: they are transmitted per-cell, per-BWP, per-cell group, per-carrier or per-BC. However, the values of the first pre-indication signal and the second pre-indication signal may be different or the same, for example: if the first pre-indication signal indicates to monitor PDCCH, the terminal monitors the PDCCH on all or part of resources of the Pcell or the PScell, where all or part of resources of the Pcell or the PScell may be referenced to the corresponding description of the above implementation manner, which is not elaborated here. If the second pre-indication signal indicates not to monitor the PDCCH, the terminal does not monitor the PDCCH on all or part of resources of the Scell, where all or part of resources of the Scell may be referenced to the corresponding description of the above implementation manner, which is not elaborated here.

In this implementation manner, monitoring or not monitoring may be performed according to the two pre-indication signals, so that the power consumption of the terminal may be further saved, for example: the PDCCH is not monitored on the Pcell or the PScell, but the PDCCH is monitored on the Scell.

As an optional implementation manner, the pre-indication signal is transmitted on a master cell group (MCG), and the first resource includes the MCG, or the first resource includes the MCG and a secondary cell group (SCG); or the pre-indication signal is transmitted on an SCG, and the first resource includes the SCG.

In this implementation manner, it may be realized that when DC is configured, the pre-indication signal may be transmitted on the MCG or SCG, and the terminal monitors the pre-indication signal on the MCG or SCG.

When the pre-indication signal on the MCG indicates that it is necessary to monitor the PDCCH, the terminal monitors the PDCCH on the MCG, or the terminal monitors the PDCCH on the MCG and the SCG;

when the pre-indication signal on the SCG indicates that it is necessary to monitor the PDCCH, the terminal monitors the PDCCH on the SCG;

when the pre-indication signal on the MCG indicates that it is unnecessary to monitor the PDCCH, the terminal does not monitor the PDCCH on the MCG, or the terminal does not monitor the PDCCH on the MCG and the SCG; and when the pre-indication signal on the SCG indicates that it is unnecessary to monitor the PDCCH, the terminal does not monitor the PDCCH on the SCG.

In this implementation manner, it may be applied to a DC scene, and the power consumption of the terminal may be saved in the DC scene.

It should be noted that the first resource including the MCG may include all resources in the MCG, the first resource includes all resources in the MCG and the SCG, and the first resource including the SCG may include all resources in the SCG, for example: the pre-indication signal is transmitted per-cell group. Alternately, the first resource including the MCG may include part of resources in the MCG, the first resource includes part of resources in the MCG and the SCG, and the first resource including the SCG may include part of resources in the SCG, for example: the pre-indication signal is transmitted per-BWP, per-carrier or per-BC. The details may be as follows:

in the case that the pre-indication signal is transmitted on the MCG, if the pre-indication signal is transmitted per-BWP, the first resource may include a BWP which transmits the pre-indication signal in the MCG, or the first resource may include a BWP which transmits the pre-indication signal in the MCG and the SCG; or if the pre-indication signal is transmitted per-carrier, the first resource may include a carrier which transmits the pre-indication signal in the MCG, or the first resource may include a carrier which transmits the pre-indication signal in the MCG and the SCG; or if the pre-indication signal is transmitted per-BC, the first resource may include a BC which transmits the pre-indication signal in the MCG, or the first resource may include a BC which transmits the pre-indication signal in the MCG and the SCG.

In the case that the pre-indication signal is transmitted on the SCG, if the pre-indication signal is transmitted per-BWP, the first resource may include a BWP which transmits the pre-indication signal in the SCG; or if the pre-indication signal is transmitted per-carrier, the first resource may include a carrier which transmits the pre-indication signal in the SCG; or if the pre-indication signal is transmitted per-BC, the first resource may include a BC which transmits the pre-indication signal in the SCG.

As an optional implementation manner, the pre-indication signal includes:

a third pre-indication signal transmitted on an MCG and a fourth pre-indication signal transmitted on an SCG, where a first source corresponding to the third pre-indication signal includes the MCG, and a first resource corresponding to the fourth pre-indication signal includes the SCG.

In this implementation manner, it may also be applied to a DC scene, and the power consumption of the terminal may be saved in the DC scene.

It should be noted that the third pre-indication signal and the fourth pre-indication signal may be the same type of indication signal, for example: they are transmitted per-cell, per-BWP, per-cell group, per-carrier or per-BC. However, the values of the third pre-indication signal and the fourth pre-indication signal may be different, for example: if the third pre-indication signal indicates to monitor PDCCH, the terminal monitors the PDCCH on all or part of resources of the MCG, where all or part of resources of the MCG may be referenced to the corresponding description of the above implementation manner, which is not elaborated here. If the fourth pre-indication signal indicates not to monitor the PDCCH, the terminal does not monitor the PDCCH on all or part of resources of the SCG, where all or part of resources of the SCG may be referenced to the corresponding description of the above implementation manner, which is not elaborated here.

In this implementation manner, monitoring or not monitoring may be performed according to the two pre-indication signals, so that the power consumption of the terminal may be further saved, for example: the PDCCH is not monitored on the MCG, but the PDCCH is monitored on the SCG.

In some embodiments of the present disclosure, a pre-indication signal is received, where the pre-indication signal is configured to indicate to monitor a physical downlink control channel (PDCCH) or not to monitor the PDCCH; and according to the pre-indication signal, a monitoring behavior is performed on a first resource corresponding to the pre-indication signal. In this way, the terminal performs monitoring behavior according to the pre-indication signal, so that the power consumption of the terminal may be saved.

Figures 3, 4, 5:
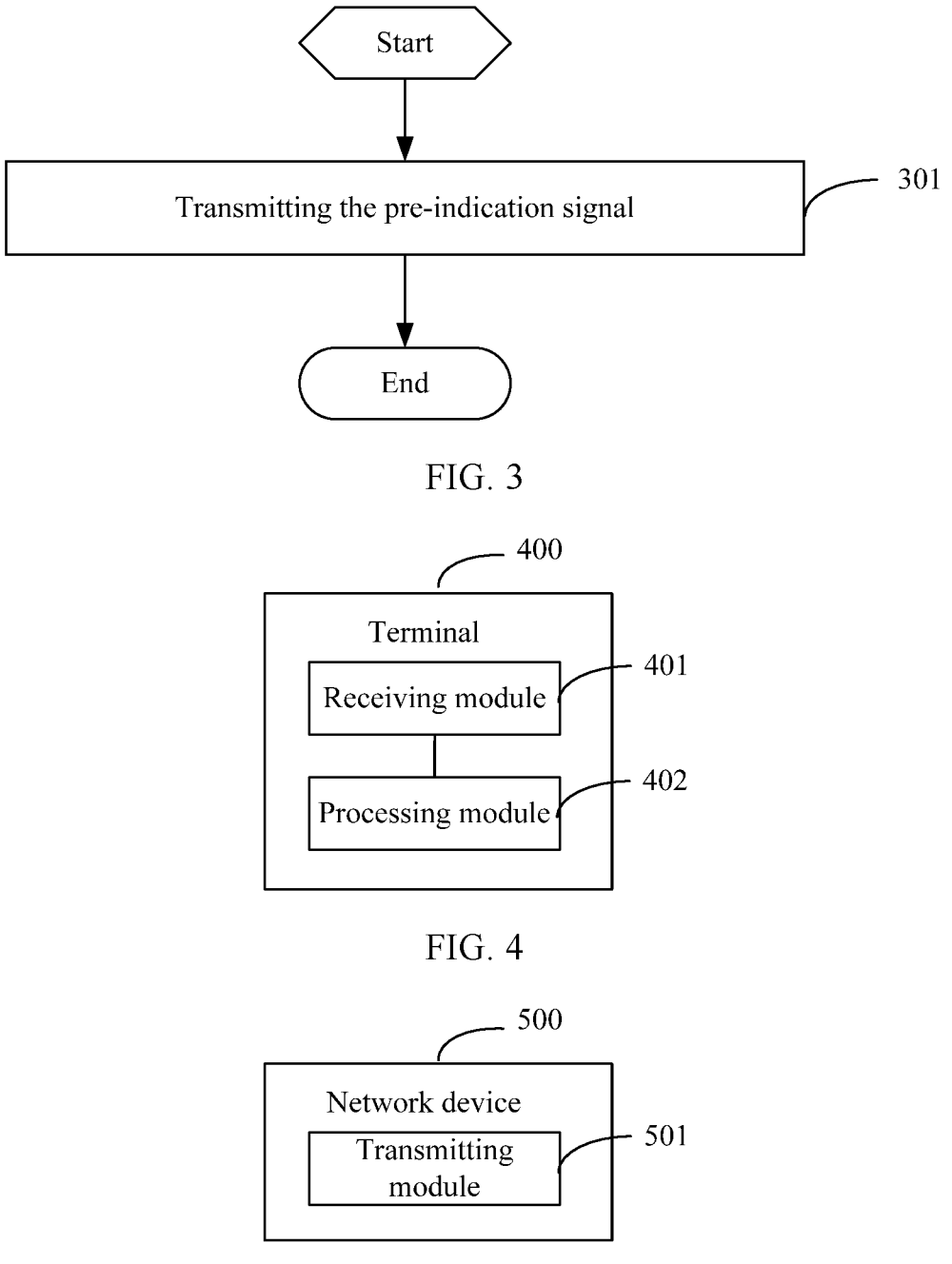
FIG. 3 is another flowchart of a method for transmitting an indication signal according to some embodiments of the present disclosure.
FIG. 4 is a structural diagram of a terminal according to some embodiments of the present disclosure.
FIG. 5 is a structural diagram of a network device according to some embodiments of the present disclosure.

Referring to FIG. 3, FIG. 3 is a flowchart of another method for transmitting an indication signal according to some embodiments of the present disclosure. The method is applied to a network device. As shown in FIG. 3, the method includes the following steps:

Step 301: transmitting a pre-indication signal, where the pre-indication signal is configured to indicate to monitor PDCCH or not to monitor the PDCCH.

Optionally, the pre-indication signal is transmitted per-cell, per-BWP, per-cell group and per-BC.

Optionally, the pre-indication signal is transmitted on a Pcell or a PScell; or the pre-indication signal includes:

a first pre-indication signal transmitted on a Pcell or a PScell and a second pre-indication signal transmitted on a Scell.

Optionally, the pre-indication signal indicates, through first information, whether to monitor the PDCCH on the Pcell or the Pscell or not, and/or indicates, through second information, whether to monitor the PDCCH on the Scell.

Optionally, the pre-indication signal indicates, through third information, whether to monitor the PDCCH on the Pcell and the Scell respectively, or indicates, through third information, whether to monitor the PDCCH on the PScell and the Scell respectively.

Optionally, the pre-indication signal is transmitted on an MCG or an SCG; or the pre-indication signal includes:

a third pre-indication signal transmitted on an MCG and a fourth pre-indication signal transmitted on an SCG.

Optionally, the pre-indication signal includes:

an indication signal, a paging indication, a WUS or a GTS signal per-first resource.

Optionally, the indication signal per-first resource is configured to indicate to monitor the PDCCH or not to monitor the PDCCH on the first resource.

It should be noted that this embodiment is used as an implementation manner of the network device corresponding to the embodiment shown in FIG. 2. The specific implementation manner of this embodiment may be referenced to the related description of the embodiment shown in FIG. 2. To avoid repeated description, details are not described again in this embodiment, and the power consumption of the terminal may be saved by transmitting the pre-indication signal.

Referring to FIG. 4, FIG. 4 is a structural diagram of a terminal according to some embodiments of the present disclosure. As shown in FIG. 4, a terminal 400 includes:

a receiving module 401, configured to receive a pre-indication signal, where the pre-indication signal is configured to indicate to monitor a physical downlink control channel (PDCCH) or not to monitor the PDCCH; and a processing module 402, configured to perform a monitoring behavior on a first resource corresponding to the pre-indication signal according to the pre-indication signal.

Optionally, the processing module 402 is configured to monitor the PDCCH on the first resource corresponding to the pre-indication signal in the case that the pre-indication signal indicates to monitor the PDCCH; or the processing module 402 is configured to not monitor the PDCCH on the first resource corresponding to the pre-indication signal in the case that the pre-indication signal indicates not to monitor the PDCCH.

Optionally, the pre-indication signal is transmitted per-cell, per-BWP, per-cell group, per-carrier or per-BC.

Optionally, if the pre-indication signal is transmitted per-cell, the first resource includes a cell which transmits the pre-indication signal; or if the pre-indication signal is transmitted per-BWP, the first resource comprises the BWP which transmits the pre-indication signal; or if the pre-indication signal is transmitted per-cell group, the first resource comprises the cell group which transmits the pre-indication signal; or if the pre-indication signal is transmitted per-carrier, the first resource includes a carrier which transmits the pre-indication signal; or if the pre-indication signal is transmitted per-BC, the first resource includes a BC which transmits the pre-indication signal.

Optionally, if the pre-indication signal is transmitted per-cell, the first resource includes an active BWP, an initial BWP, a default BWP or a configured BWP of the cell which transmits the pre-indication signal.

Optionally, the pre-indication signal is transmitted on a Pcell, and the first resource includes the Pcell, or the first resource includes the Pcell and an Scell; or the pre-indication signal is transmitted on a primary secondary cell (PScell), and the first resource includes the PScell, or the first resource includes the PScell and the Scell.

If the pre-indication signal is transmitted per-BWP, the first resource includes a BWP which transmits the pre-indication signal in the Pcell or the PScell, or the first resource includes a BWP which transmits the pre-indication signal in the Pcell and the Scell, or the first resource includes a BWP which transmits the pre-indication signal in the PScell and the Scell; or if the pre-indication signal is transmitted per-carrier, the first resource includes a carrier which transmits the pre-indication signal in the Pcell or the PScell, or the first resource includes a carrier which transmits the pre-indication signal in the Pcell and the Scell, or the first resource includes a carrier which transmits the pre-indication signal in the PScell and the Scell; or if the pre-indication signal is transmitted per-BC, the first resource includes a BC which transmits the pre-indication signal in the Pcell or the PScell, or the first resource includes a BC which transmits the pre-indication signal in the Pcell and the Scell, or the first resource includes a BC which transmits the pre-indication signal in the PScell and the Scell.

Optionally, the pre-indication signal indicates, through first information, whether to monitor the PDCCH on the Pcell or the Pscell or not, and/or indicates, through second information, whether to monitor the PDCCH on the Scell.

Optionally, the pre-indication signal indicates, through third information, whether to monitor the PDCCH on the Pcell and the Scell respectively, or indicates, through third information, whether to monitor the PDCCH on the PScell and the Scell respectively.

Optionally, the pre-indication signal includes:

a first pre-indication signal transmitted on a Pcell or a PScell and a second pre-indication signal transmitted on a Scell, where a first source corresponding to the first pre-indication signal includes the Pcell or the PScell, and a first resource corresponding to the second pre-indication signal includes the Scell.

Optionally, the pre-indication signal is transmitted on an MCG, and the first resource includes the MCG, or the first resource includes the MCG and a secondary cell group (SCG); or the pre-indication signal is transmitted on an SCG, and the first resource includes the SCG.

Optionally, the pre-indication signal includes:

a third pre-indication signal transmitted on an MCG and a fourth pre-indication signal transmitted on an SCG, where a first source corresponding to the third pre-indication signal includes the MCG, and a first resource corresponding to the fourth pre-indication signal includes the SCG.

Optionally, the pre-indication signal includes:

an indication signal, a paging indication, a wake-up signaling (WUS) or a go-to-sleep (GTS) signal per-first resource.

Optionally, the indication signal per-first resource is configured to indicate to monitor the PDCCH or not to monitor the PDCCH on the first resource.

The terminal provided in some embodiments of the present disclosure can implement the processes implemented by the terminal in the method embodiment in FIG. 2. To avoid repetition, details are not described herein again. In addition, the power consumption of the terminal may be saved by transmitting the pre-indication signal.

Referring to FIG. 5, FIG. 5 is a structural diagram of a network device according to some embodiments of the present disclosure. As shown in FIG. 5, a network device 500 includes:

a transmitting module 501, configured to transmit a pre-indication signal, where the pre-indication signal is configured to indicate to monitor PDCCH or not to monitor the PDCCH.

Optionally, the pre-indication signal is transmitted per-cell, per-BWP, per-cell group and per-BC.

Optionally, the pre-indication signal is transmitted on a Pcell or a PScell; or the pre-indication signal includes:

a first pre-indication signal transmitted on a Pcell or a PScell and a second pre-indication signal transmitted on a Scell.

Optionally, the pre-indication signal indicates, through first information, whether to monitor the PDCCH on the Pcell or the Pscell or not, and/or indicates, through second information, whether to monitor the PDCCH on the Scell.

Optionally, the pre-indication signal indicates, through third information, whether to monitor the PDCCH on the Pcell and the Scell respectively, or indicates, through third information, whether to monitor the PDCCH on the PScell and the Scell respectively.

Optionally, the pre-indication signal is transmitted on an MCG or an SCG; or the pre-indication signal includes:

a third pre-indication signal transmitted on an MCG and a fourth pre-indication signal transmitted on an SCG.

Optionally, the pre-indication signal includes:

an indication signal, a paging indication, a WUS or a GTS signal per-first resource.

Optionally, the indication signal per-first resource is configured to indicate to monitor the PDCCH or not to monitor the PDCCH on the first resource.

The network device provided in some embodiments of the present disclosure can implement the processes implemented by the network device in the method embodiment in FIG. 3. To avoid repetition, details are not described herein again, and the power consumption of the terminal may be saved.

Figures 6, 7:
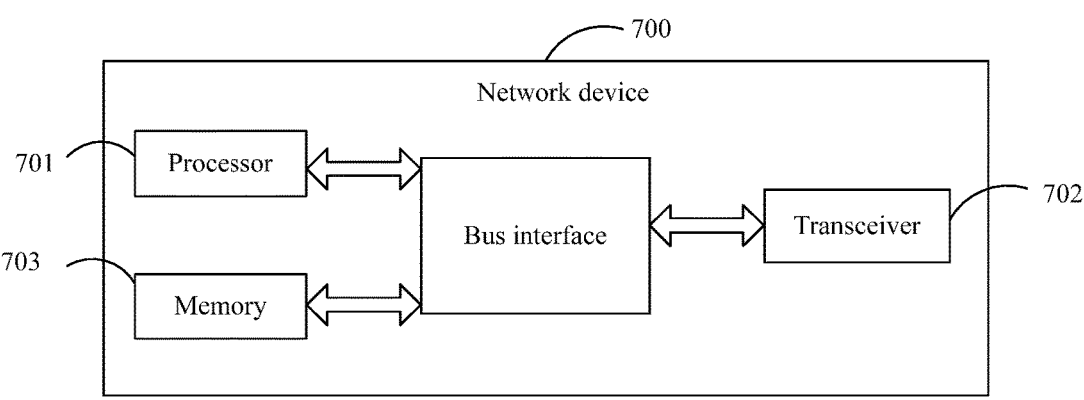
FIG. 6 is another structural diagram of a terminal according to some embodiments of the present disclosure.
FIG. 7 is another structural diagram of a network device according to some embodiments of the present disclosure.

FIG. 6 is a schematic diagram of a hardware structure of a terminal according to embodiments of the present disclosure.

The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. A person skilled in the art may understand that the structure of the terminal shown in FIG. 6 does not constitute a limitation to the terminal. The terminal may include more or fewer components than that shown in the figure, or a combination of some components, or an arrangement of different components. In some embodiments of the present disclosure, the terminal includes but is not limited to a mobile phone, a tablet computer, a notebook computer, a palmtop computer, a vehicle-mounted terminal, a wearable device, a pedometer, and the like.

The radio frequency unit 601 is configured to receive a pre-indication signal, where the pre-indication signal is configured to indicate to monitor a physical downlink control channel (PDCCH) or not to monitor the PDCCH; and the radio frequency unit 601 is further configured to perform a monitoring behavior on a first resource corresponding to the pre-indication signal according to the pre-indication signal.

Optionally, the step that radio frequency unit 601 performs the monitoring behavior on the first resource corresponding to the pre-indication signal according to the pre-indication signal includes:

the PDCCH is monitored on the first resource corresponding to the pre-indication signal in the case that the pre-indication signal indicates to monitor the PDCCH; or the PDCCH is not monitored on the first resource corresponding to the pre-indication signal in the case that the pre-indication signal indicates not to monitor the PDCCH.

It should be noted that the transmitting mode and the indicating content of the pre-indication signal, and the corresponding first resource may be referenced to the corresponding descriptions of the above method embodiments, which is not elaborated here; and the same beneficial effect is achieved.

The terminal may save power consumption.

It should be understood that, in some embodiments of the present disclosure, the radio frequency unit 601 may be configured to receive and transmit information or a signal in a call process. Specifically, after downlink data from a base station is received, the radio frequency unit 601 transmits the downlink data to the processor 610 for processing. In addition, the radio frequency unit 601 transmits uplink data to the base station. Generally, the radio frequency unit 601 includes but is not limited to: an antenna, at least one amplifier, a transceiver, a coupler, a low noise amplifier, a duplexer, and the like. In addition, the radio frequency unit 601 may also communicate with other devices through a wireless communication system and network.

The terminal provides wireless broadband Internet access for the user by using the network module 602, for example, helping the user to send and receive an e-mail, browse a web page, and access streaming media.

The audio output unit 603 may convert audio data received by the radio frequency unit 601 or the network module 602 or stored in the memory 609 into an audio signal, and output the audio signal into sound. In addition, the audio output unit 603 may also provide audio output related to a specific function performed by the terminal 600 (for example, call signal receiving sound or message receiving sound). The audio output unit 603 includes a loudspeaker, a buzzer, a receiver, and the like.

The input unit 604 is configured to receive audio or video signals. The input unit 604 may include a graphics processing unit (GPU) 6041 and a microphone 6042, and the graphics processing unit 6041 processes image data of a still picture or video obtained by an image capture device (such as a camera) in a video capture mode or an image capture mode. A processed image frame may be displayed on the display unit 606. The image frame processed by the graphics processing unit 6041 may be stored in the memory 609 (or other storage mediums) or sent by using the radio frequency unit 601 or the network module 602. The microphone 6042 may receive a sound and can process such sound into audio data. The processed audio data may be converted, in a telephone call mode, into a format that may be sent by the radio frequency unit 601 to a mobile communication base station for output.

The terminal 600 further includes at least one sensor 605, for example, a light sensor, a motion sensor, and other sensors. Specifically, the light sensor includes an ambient light sensor and a proximity sensor, where the ambient light sensor may adjust brightness of a display panel 6061 based on brightness of ambient light, and the proximity sensor may turn off the display panel 6061 and/or backlight when the terminal 600 is moved towards the ear. As a type of the motion sensor, an accelerometer sensor may detect an acceleration value in each direction (generally, three axes), and detect a value and a direction of gravity when the accelerometer sensor is static, and may be configured to recognize a terminal posture (such as screen switching between landscape and portrait modes, a related game, or magnetometer posture calibration), a function related to vibration recognition (such as a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information entered by a user or information provided for the user. The display unit 606 may include a display panel 6061, and the display panel 6061 may be configured in a form of a liquid crystal display (LCD), an organic light-emitting diode (OLED), or the like.

The user input unit 607 may be configured to receive input digital or character information, and generate key signal input related to user setting and function control of a terminal. In particular, the user input unit 607 includes a touch panel 6071 and other input devices 6072. The touch panel 6071, also called a touch screen, may collect touch operation on or near the touch panel by users (for example, operation on the touch panel 6071 or near the touch panel 6071 by fingers or any suitable objects or accessories such as a touch pen by the users). The touch panel 6071 may include two parts: a touch detection device and a touch controller. The touch detection device detects a touch position of the user, detects a signal brought by the touch operation, and transmits the signal to the touch controller. The touch controller receives touch information from the touch detection device, converts the touch information into contact coordinates, sends the contact coordinates to the processor 610, and receives and executes a command sent by the processor 610. In addition, the touch panel 6071 may be implemented by various types such as a resistive type, a capacitive type, an infrared ray type or a surface acoustic wave type. In addition to the touch panel 6071, the user input unit 607 may further include other input devices 6072. Specifically, the other input devices 6072 may include but are not limited to a physical keyboard, a functional key (such as a volume control button or a power on/off key), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external device to the terminal 600. For example, the external device may include a wired or wireless headphone port, an external power supply (or a battery charger) port, a wired or wireless data port, a storage card port, a port configured to connect an device having an identity module, an audio input/output (I/O) port, a video I/O port, a headset port, and the like. The interface unit 608 may be configured to receive an input (for example, data information and power) from the external device and transmit the received input to one or more elements in the terminal 600, or transmit data between the terminal 600 and the external device.

The memory 609 may be configured to store software programs and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, the memory 609 may include a high-speed random access memory, and may further include a nonvolatile memory, for example, at least one disk storage device, a flash memory, or other volatile solid-state storage devices.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, and an application. The modem processor mainly deals with wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules that are not shown, which are not elaborated here.

Optionally, some embodiments of the present disclosure further provide a terminal, including a processor 610, a memory 609 and a program which is stored in the memory 609 and capable of running on the processor 610, wherein when the program is executed by the processor 610, the processes of the embodiments of the forgoing method for transmitting the indication signal are implemented, and the same technical effect can be achieved. To avoid repetition, details are not described herein again.

Referring to FIG. 7, FIG. 7 is a structural diagram of another network device according to some embodiments of the present disclosure. As shown in FIG. 7, a network device 700 includes: a processor 701, a transceiver 702, a memory 703 and a bus interface, where the transceiver 702 is configured to transmit a pre-indication signal, the pre-indication signal being configured to indicate to monitor PDCCH or not to monitor the PDCCH.

It should be noted that the transmitting mode and the indicating content of the pre-indication signal may be referenced to the corresponding descriptions of the above method embodiments, which is not elaborated here; and the same beneficial effect is achieved.

The network device enables the terminal to save power consumption by transmitting the pre-indication signal.

The transceiver 702 is configured to receive and transmit data under the control of the processor 701. The transceiver 702 includes at least two antenna ports.

In FIG. 7, the bus architecture may include any number of interconnected buses and bridges, which are specifically linked together by various circuits of one or more processors represented by the processor 701 and a memory represented by the memory 703. The bus architecture may further link various other circuits such as a peripheral device, a voltage regulator, and a power management circuit together. These are all well-known in the art, and therefore are not further described in this specification. The bus interface provides interfaces. The transceiver 702 may be a plurality of elements, in other words, includes a transmitter and a receiver, and provides a unit configured to communicate with various other devices on a transmission medium. For different user equipment, the user interface 704 may further be an interface capable of externally and internally connecting required equipment. The connected equipment includes but is not limited to a keypad, a display, a speaker, a microphone, a joystick, and the like.

The processor 701 is responsible for bus architecture management and general processing. The memory 703 may store data used by the processor 701 when the processor 701 performs an operation.

Optionally, some embodiments of the present disclosure further provide a network device, including a processor 701, a memory 703 and a computer program which is stored in the memory 703 and capable of running on the processor 701, where when the computer program is executed by the processor 701, the processes of the embodiments of the method for transmitting the indication signal are implemented, and the same technical effect can be achieved. To avoid repetition, details are not described herein again.

Some embodiments of the present disclosure further provide a computer readable storage medium. The computer readable storage medium stores a computer program, where when the computer program is executed by a processor, the processes of the embodiments of the method for transmitting the indication signal at the terminal side provided in some embodiments of the present disclosure are implemented, or when the computer program is executed by a processor, the processes of the embodiments of the method for transmitting the indication signal at the network device side provided in some embodiments of the present disclosure are implemented; and the same technical effect can be achieved. To avoid repetition, details are not described herein again. The computer readable storage medium is, for example, a read-only memory (ROM for short), a random access memory (RAM for short), a magnetic disk, or an optical disk.

It should be noted that, in this specification, the terms "include", "comprise", or their any other variant is intended to cover a non-exclusive inclusion, so that a process, a method, an article, or an device that includes a list of elements not only includes those elements but also includes other elements which are not expressly listed, or further includes elements inherent to such process, method, article, or device. In the absence of more limitations, an element defined by "including a . . . " does not preclude the existence of other identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

It may be understood that the embodiments described in the embodiments of the present disclosure may be implemented by hardware, software, firmware, middleware, microcode, or a combination thereof. For hardware implementation, a processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A method for transmitting an indication signal, applied to a terminal, comprising:

receiving a wake-up signaling (WUS), wherein the WUS is configured to indicate to monitor a physical downlink control channel (PDCCH) or not to monitor the PDCCH; and performing a monitoring behavior on a first resource according to the WUS signal;

wherein the WUS is transmitted on a master cell group (MCG), and the first resource comprises the MCG and a secondary cell group (SCG).

2. The method according to claim 1, wherein the performing the monitoring behavior on the first resource corresponding to the WUS according to the WUS comprises:

monitoring the PDCCH on the first resource corresponding to the WUS in the case that the WUS indicates to monitor the PDCCH; or not monitoring the PDCCH on the first resource corresponding to the WUS in the case that the WUS indicates not to monitor the PDCCH.

3. A method for transmitting an indication signal, applied to a network device, comprising:

transmitting a wake-up signaling (WUS), wherein the WUS is configured to indicate to monitor physical downlink control channel (PDCCH) or not to monitor the PDCCH;

wherein the WUS is transmitted on a master cell group (MCG), and thea first resource comprises the MCG and a secondary cell group (SCG) when the WUS causes a terminal to perform a monitoring behavior on the first resource.

4. A network device, comprising: a memory, a processor and a program which is stored in the memory and capable of running on the processor, wherein when the program is executed by the processor, steps of the method for transmitting the indication signal as defined in claim 3 are implemented.

5. A terminal, comprising: a memory, a processor and a program which is stored in the memory and capable of running on the processor, wherein when the program is executed by the processor, following steps are implemented:

receiving a wake-up signaling (WUS), wherein the WUS is configured to indicate to monitor a physical downlink control channel (PDCCH) or not to monitor the PDCCH; and performing a monitoring behavior on a first resource according to the WUS signal;

wherein the WUS is transmitted on a master cell group (MCG), and the first resource comprises the MCG and a secondary cell group (SCG).

* * * * *